(12) United States Patent
Mitsugi et al.

(10) Patent No.: US 9,140,778 B2
(45) Date of Patent: Sep. 22, 2015

(54) BASEBAND AMPLIFIER UNIT AND PULSE RADAR DEVICE

(75) Inventors: Kenichi Mitsugi, Gunma (JP); Takeshi Ichihara, Gunma (JP)

(73) Assignee: YOKOWO CO., LTD., Tokyo (JP)

( * ) Notice: Subject to any disclaimer, the term of this patent is extended or adjusted under 35 U.S.C. 154(b) by 345 days.

(21) Appl. No.: 13/876,114

(22) PCT Filed: Sep. 9, 2011

(86) PCT No.: PCT/JP2011/070633
§ 371 (c)(1),
(2), (4) Date: Jun. 6, 2013

(87) PCT Pub. No.: WO2012/043196
PCT Pub. Date: Apr. 5, 2012

(65) Prior Publication Data
US 2013/0278458 A1    Oct. 24, 2013

(30) Foreign Application Priority Data
Sep. 30, 2010 (JP) ................................. 2010-221178

(51) Int. Cl.
*G01S 7/28* (2006.01)
*G01S 7/292* (2006.01)
*G01S 13/93* (2006.01)

(52) U.S. Cl.
CPC ............... *G01S 7/28* (2013.01); *G01S 7/2921* (2013.01); *G01S 13/931* (2013.01)

(58) Field of Classification Search
CPC ........ G01S 13/931; G01S 7/28; G01S 7/2921
USPC ....................................................... 342/202
See application file for complete search history.

(56) References Cited

U.S. PATENT DOCUMENTS

| 7,443,336 B2 | 10/2008 | Noda |
| 2006/0066473 A1 | 3/2006 | Yokoyama et al. |
| 2008/0238761 A1 | 10/2008 | Noda |

(Continued)

FOREIGN PATENT DOCUMENTS

| DE | 102006017007 A1 | 5/2007 |
| EP | 1643266 A1 | 4/2006 |

(Continued)

*Primary Examiner* — Timothy A Brainard
(74) *Attorney, Agent, or Firm* — Bachman & LaPointe, P.C.

(57) ABSTRACT

Provided is a pulse radar device which can attenuate an interference signal and significantly amplify a reflected wave without saturating the interference signal. A baseband amplifier unit (5) is installed in a pulse radar device (1) which is configured to transmit from antenna (3) a transmission pulse wave obtained by modulating a transmission control signal, and to be afterwards switched to a standby mode for a reflected wave obtained by reflecting the transmission pulse wave by an object to be detected. The baseband amplifier unit (5) includes: a first inverting amplifier (52) which amplifies the reflected wave; a first switch circuit (51) which is switched to a cut off state before the transmission control signal rises and is switched back to a conductive state when the transmission control signal falls, to thereby pass through a reflected wave which is input to the first inverting amplifier (52); and a second switch circuit (53) which is switched to the cut off state before the first switch circuit (51) becomes the cut off state and is switched back to the conductive state when the transmission control signal falls, to thereby pass through a signal which is output from the first inverting amplifier (52).

5 Claims, 6 Drawing Sheets

(56) References Cited

U.S. PATENT DOCUMENTS

2009/0009390 A1* 1/2009 Lee et al. .................. 342/371
2012/0026030 A1* 2/2012 Hase ......................... 342/128
2012/0165700 A1* 6/2012 Lin et al. ................... 600/587

FOREIGN PATENT DOCUMENTS

| JP | 5-11080 U | 2/1993 |
| JP | 5-80144 A | 4/1993 |
| JP | 2006098167 A | 4/2006 |
| JP | 2007139691 A | 6/2007 |

* cited by examiner

BASEBAND AMPLIFIER UNIT AND PULSE RADAR DEVICE

BACKGROUND OF THE INVENTION

1. Field of the Invention

The present invention relates to a short range pulse radar device and a component thereof, which can improve accuracy of short range measurement.

2. Background Art

A pulse radar device generates a transmission pulse wave, transmits the transmission pulse wave from an antenna toward an object to be detected, and receives by the antenna a pulse wave (reflected wave) reflected by the object to be detected during a detection time period. The received reflected wave is detected by a heterodyne method, a homodyne method, or the like. The detected reflected wave is amplified by a baseband amplifier unit. After that, the amplified reflected wave is converted into a digital signal by an analog-to-digital (A/D) converter circuit. The converted digital signal is input to a CPU and is used for detecting a distance, a relative speed, or the like by software.

The baseband amplifier unit of the pulse radar device is required to amplify the reflected wave with a relatively large gain so as to obtain a sufficient level for the A/D conversion, thereby securing accuracy in measurement of distance. In this case, the transmission pulse wave sneaking into the amplifier circuit or switching noise caused by switching between transmission and reception in the pulse radar device is applied to the baseband amplifier unit as an interference signal. As a countermeasure against this phenomenon, the amplifier is desired to amplify the signal only during the detection time period. However, because of charge and discharge within the amplifier circuit or its peripheral circuit, it is difficult to control the gain of the amplifier at high speed. Therefore, a technology to remove the interference signal is demanded.

As a method of removing the interference signal, there is a technology disclosed in Japanese Patent Laid-Open No. 2007-139691, for example. In this technology, conduction and cut-off of the received signal is controlled by a switching element in synchronization with the transmission pulse wave, and thereafter a falling edge of a pulse waveform of the received signal is delayed. Then, reception control means performs the A/D conversion of the received signal with a delay of a predetermined period of time after starting conduction of the reception signal.

SUMMARY OF THE INVENTION

According to the technology disclosed in Japanese Patent Laid-Open No. 2007-139691, short range measurement cannot be performed because the falling edge of the pulse waveform of the reception signal is delayed. In addition, due to the delaying, accuracy is deteriorated.

If it is attempted to amplify the reflected wave in order to improve accuracy, the interference signal is also amplified by the amplifier. Then, because a level of this interference signal is higher than that of the reflected wave, there occurs a problem in that the signal is saturated. If the interference signal is saturated, a waveform of the interference signal is enlarged. In addition, a base line (GND) of the signal is disturbed and is superimposed on the reflected wave. Therefore, correct A/D conversion of the signal cannot be performed, and hence accuracy of measuring the distance is remarkably lowered. In particular, because the interference signal is close to the transmission pulse wave, short range measurement is greatly affected.

In order to solve the above-mentioned problem, it is a main object of the present invention to provide a short range pulse radar device that can attenuate an interference signal such as a sneaking transmission pulse wave or switching noise, and can significantly amplify a reflected wave without saturating the interference signal, thereby improving accuracy in measurement of the distance.

A baseband amplifier unit according to the present invention solves the above-mentioned problem. The baseband amplifier unit is installed in a pulse radar device which is configured to transmit from an antenna toward an object to be detected in a short distance a transmission pulse wave obtained by modulating a transmission control signal, and to be afterwards switched to a standby mode for receiving a reflected wave from the object to be detected. The baseband amplifier unit includes: a first amplifier which amplifies the reflected wave; a first switching means for switching the reflected wave to be input to the first amplifier from one of a conductive state and a cut off state to the other state; second switching means for switching a signal to be output from the first amplifier from one of the conductive state and the cut off state to the other state; and control means for outputting a first switch control signal for controlling the first switching means to switch to the cut off state before the transmission control signal rises and to switch back to the conductive state when the transmission control signal falls, and for outputting a second switch control signal for controlling the second switching means to switch to the cut off state before the first switching means becomes the cut off state and to switch back to the conductive state when the transmission control signal falls.

The baseband amplifier unit of the present invention can attenuate the interference signal caused by transmission of the transmission pulse wave and reception of the reflected wave owing to switching noise generated in the first switching means. Therefore, the first amplifier can significantly amplify the reflected wave without saturating the interference signal. In addition, the switching noise generated in the first switching means can be attenuated by switching noise generated in the second switching means. Therefore, switching noise can be greatly attenuated. Because the reflected wave can be amplified while attenuating the interference wave, the accuracy of measuring the distance can be improved.

The baseband amplifier unit may further include: a second amplifier which amplifies the signal output from the second switching means; and third switching means for switching the signal output from the second amplifier from one of the conductive state and the cut off state to the other state. In this case, the control means is configured to output a third switch control signal for controlling the third switching means to switch to the conductive state before the transmission control signal rises and after the first switching means becomes the cut off state, and to switch back to the cut off state with a sufficient time for receiving the reflected wave.

With this configuration, the switching noise generated in the second switching means can be attenuated by the third switching means. In addition, the reflected wave can be more significantly amplified by the second amplifier.

The first switching means, the second switching means, and the third switching means preferably operate in the same polarity. Further, the first amplifier and the second amplifier are preferably inverting amplifiers.

A pulse radar device according to the present invention includes: a transmitter which generates a transmission pulse wave obtained by modulating a transmission control signal with a high frequency signal and transmits the transmission pulse wave from an antenna toward an object to be detected;

a receiver which detects a reflected wave from the object to be detected that is received by the antenna; an amplifier which amplifies the reflected wave; first switching means for switching the reflected wave input to the amplifier from one of a conductive state and a cut off state to the other state; second switching means for switching a signal output from the amplifier from one of the conductive state and the cut off state to the other state; and control means for outputting a first switch control signal for controlling the first switching means to switch to the cut off state before the transmission control signal rises and to switch back to the conductive state when the transmission control signal falls, and for outputting a second switch control signal for controlling the second switching means to switch to the cut off state before the first switching means becomes the cut off state and to switch back to the conductive state when the transmission control signal falls.

As described above, in the present invention, the switching means and the amplifier are provided, and hence the reflected wave can be amplified while suppressing the interference signal as much as possible. Thus, the accuracy of measuring the distance can be improved.

BRIEF DESCRIPTION OF THE DRAWINGS

FIG. 4(a) shows a case where the baseband amplifier unit is not provided, while FIG. 4(b) shows a case where the baseband amplifier unit is provided.

DESCRIPTION of THE PREFERRED EMBODIMENTS

In the following, an embodiment in which the present invention is applied to a radar device to be used in a millimeter wave band is described in detail with reference to the drawings.

Figure 1:
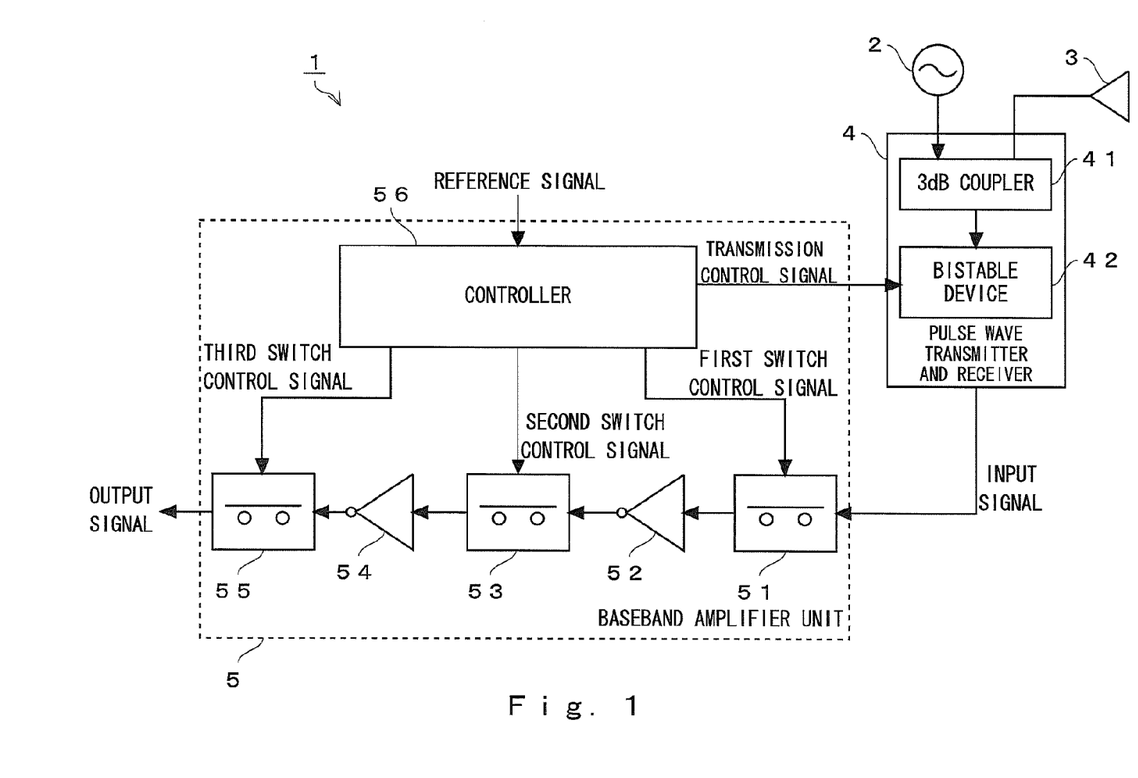
FIG. 1 is a block diagram of a pulse radar device.

FIG. 1 is a block diagram of a pulse radar device 1 to which the present invention is applied.

The pulse radar device 1 includes a high frequency oscillator 2 for transmission and reception, a transmission and reception antenna 3, a pulse wave transmitter and receiver 4, and a baseband amplifier unit 5. The pulse radar device 1 uses a high frequency signal generated by the high frequency oscillator 2 to generate a transmission pulse wave and transmits the transmission pulse wave to an object to be detected. Following the transmission of the transmission pulse wave, the pulse radar device 1 is switched to a standby mode for receiving a reflected wave from the object to be detected so as to receive the reflected wave. On the basis of lapsed time period from the transmission of the transmission pulse wave to the reception of the reflected wave, a distance to the object to be detected or a relative speed can be detected by processing data obtained from the reflected wave. Preferably, the pulse wave transmitter and receiver 4 and the baseband amplifier unit 5 are housed in the same container or casing. This pulse radar device 1 can be used for an on-vehicle short range radar.

The high frequency oscillator 2 generates a high frequency signal such as a millimeter wave signal, and inputs the high frequency signal to the pulse wave transmitter and receiver 4. The high frequency signal is used for generating the transmission pulse wave in the transmission, and is used for detection such as heterodyne detection or homodyne detection in the reception.

The transmission and reception antenna 3 transmits the transmission pulse wave sent from a 3 dB coupler 41 in the transmission. In the reception, the transmission and reception antenna 3 receives the reflected wave from the object to be detected. The reflected wave is sent to the pulse wave transmitter and receiver 4 as a reception signal.

The pulse wave transmitter and receiver 4 includes the 3 dB coupler 41 and a bistable device 42. The pulse wave transmitter and receiver 4 modulates a transmission control signal described later with the high frequency signal so as to generate the transmission pulse wave, and detects the reflected wave by the high frequency signal.

The 3 dB coupler 41 is a four-terminal device having first to fourth terminals, for example. Signals input to the first and second terminals are output respectively from the third and fourth terminals as signals having half power and different phases by 90 degrees from each other. Similarly, signals input to the third and fourth terminals are output respectively from the first and second terminals as signals having half power and different phases by 90 degrees from each other. Signal input and output is not performed between the first terminal and the second terminal, as well as between the third terminal and the fourth terminal.

The first terminal inputs the high frequency signal from the high frequency oscillator 2. The second terminal is connected to the transmission and reception antenna 3. The second terminal sends the transmission pulse wave to the transmission and reception antenna 3 in the transmission, and inputs the reflected wave from the transmission and reception antenna 3 in the reception. Each of the third and fourth terminals is connected to the bistable device 42.

The bistable device 42 takes an impedance matching state or an impedance mismatching state with the third and fourth terminals of the 3 dB coupler 41. When the bistable device 42 becomes the impedance matching state, the signal output from the 3 dB coupler 41 is sent to the baseband amplifier unit 5. The reception of the reflected wave is performed in this state. When the bistable device 42 becomes the impedance mismatching state, the transmission pulse wave is substantially totally reflected by the bistable device 42 side of the 3 dB coupler 41. The transmission of the transmission pulse wave is performed in this state. As bistable devices 42, a Schottky barrier diode can be used, for example.

The baseband amplifier unit 5 amplifies the signal input from the pulse wave transmitter and receiver 4 (hereinafter referred to as "input signal"). The input signal from the pulse wave transmitter and receiver 4 contains, besides the reflected wave detected by the pulse wave transmitter and receiver 4, an interference signal such as sneaking transmission pulse wave and switching noise generated by switching between transmission and reception in the pulse wave transmitter and receiver 4. In this embodiment, the baseband amplifier unit 5 is constituted by serial connection of first to third switch circuits 51, 53, and 55 and first and second inverting amplifiers 52 and 54. Further, the baseband amplifier unit 5 includes a controller 56 that performs switch control of the first to third switch circuits 51, 53, and 55 and operation control of the bistable device 42. The first and second switch circuits 51 and 53 are disposed before and after the first inverting amplifier 52, and the second and third switch circuits 53 and 55 are disposed before and after the second inverting amplifier 54.

The controller 56 generates the transmission control signal that is a pulse signal for switching between the impedance matching state and the impedance mismatching state of the bistable device 42, and first to third switch control signals for controlling a conductive state and a cut off state of the first to third switch circuits 51, 53, and 55 of the baseband amplifier unit 5, and sends such signals to the bistable device 42 and the first to third switch circuits 51, 53, and 55, respectively. The controller 56 generates the transmission control signal and the first to third switch control signals in synchronization with a reference signal input from the outside. Because the controller 56 controls conduction and cut-off of each of the first to third switch circuits 51, 53, and 55 by the first to third switch control signals, it is possible to control a delay time by the first to third switch circuits 51, 53, and 55.

As the first to third switch circuits 51, 53, and 55, it is possible to use a general-purpose high frequency diode, a high speed and low current FET, or a MEMS if low distortion is particularly required. Note that, the controller 56 may be disposed independently of the baseband amplifier unit 5.

Figure 2:
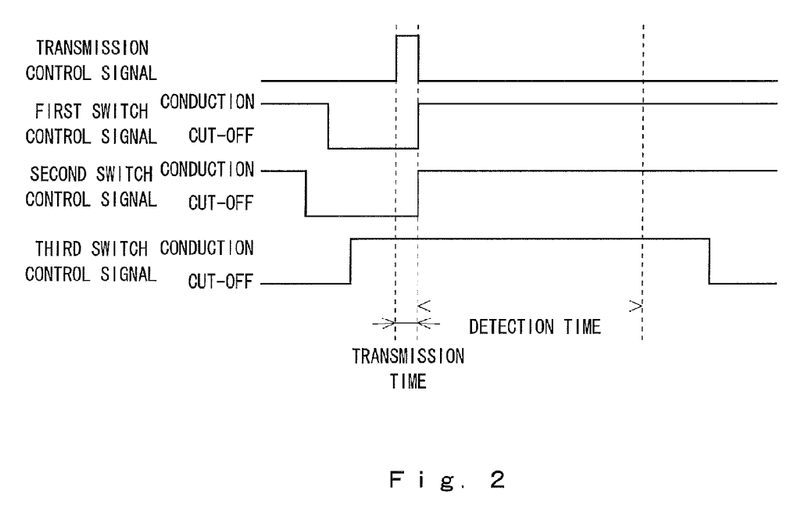
FIG. 2 is a diagram illustrating operation timings of first to third switch circuits.

FIG. 2 is a diagram illustrating operation timings of the first to third switch circuits 51, 53, and 55.

The first switch circuit 51 attenuates the sneaking transmission pulse wave contained in the input signal and the switching noise caused by the pulse wave transmitter and receiver 4. The first switch circuit 51 is normally in the conductive state, becomes the cut off state before the start of transmission of (the rise of) the transmission pulse wave, and becomes the conductive state upon the end of transmission of (the fall of) the transmission pulse wave. Switching between conduction and cut-off of the first switch circuit 51 generates noise, but the noise is combined with the switching noise caused by the pulse wave transmitter and receiver 4, and hence the switching noise is attenuated.

The first inverting amplifier 52 inverts and amplifies the signal input from the first switch circuit 51.

The second switch circuit 53 attenuates the sneaking transmission pulse wave inverted and amplified by the first inverting amplifier 52, the switching noise by the pulse wave transmitter and receiver 4, and the noise in switching between conduction and cut-off by the first switch circuit 51. The second switch circuit 53 is normally in the conductive state, becomes the cut off state before the transition of the first switch circuit 51 to the cut off state, and becomes the conductive state upon the end of transmission of (the fall of) the transmission pulse wave. A combined waveform of the switching noise by the pulse wave transmitter and receiver 4 and the noise by the first switch circuit 51 is combined with noise by the second switch circuit 53 and is attenuated, because the polarity thereof is inversed by the first inverting amplifier 52.

The second inverting amplifier 54 inverts and amplifies the signal input from the second switch circuit 53.

The third switch circuit 55 attenuates the noise that is generated by the first and second switch circuits 51 and 53 and is inverted and amplified by the second inverting amplifier 54. The third switch circuit 55 is normally in the cut off state, becomes the conductive state before the start of transmission of the transmission pulse wave when the first switch circuit 51 is in the cut off state, and becomes the cut off state after lapse of a detection time for distance measurement. Noise generated in switching between conduction and cut-off by the third switch circuit 55 does not affect the reflected wave, because the noise is out of the detection time and is not amplified.

It is possible to dispose an additional amplifier after the third switch circuit 55. This amplifier has a gain such that the noise generated by the third switch circuit 55 is not saturated. In addition, it is possible to add a filter for high frequency noise. As the filter in this case, it is preferred to use a Bessel filter, a Gaussian filter, or the like having good phase deviation and group delay characteristics, so as to reduce a waveform fluctuation of the pulse wave.

The baseband amplifier unit 5 having the above-mentioned configuration uses the first and second inverting amplifiers 52 and 54 and the high active first to third switch circuits 51, 53, and 55. Because the first to third switch circuits 51, 53, and 55 operate individually in conjunction with one another, the gain can be distributed, and the polarity of the reflected wave is not inverted. In addition, because the first to third switch circuits 51, 53, and 55 of the same type are used, the circuit can be simplified, noise can be greatly attenuated, and the reflected wave can be greatly amplified. Note that, the first to third switch circuits 51, 53, and 55 are configured to be high active so that the circuit structure can be simplified in this embodiment, but all the switch circuits may be low active. In other words, it is sufficient that the first to third switch circuits 51, 53, and 55 have the same polarity.

Noise is generated in each of the first to third switch circuits 51, 53, and 55 due to the switching operation thereof. However, as described above, the switching noise generated in the first switch circuit 51 is inverted by the first inverting amplifier 52 and hence is attenuated by the switching noise generated in the second switch circuit 53. In addition, the switching noise generated in the second switch circuit 53 is inverted by the second inverting amplifier 54 and hence is attenuated by the switching noise generated in the third switch circuit 55. In other words, because the first and second inverting amplifiers 52 and 54 invert the switching noises generated in the first and second switch circuits 51 and 53 disposed upstream and downstream, the switching noises are attenuated so that only the reflected wave of the input signal is amplified.

Figure 3:
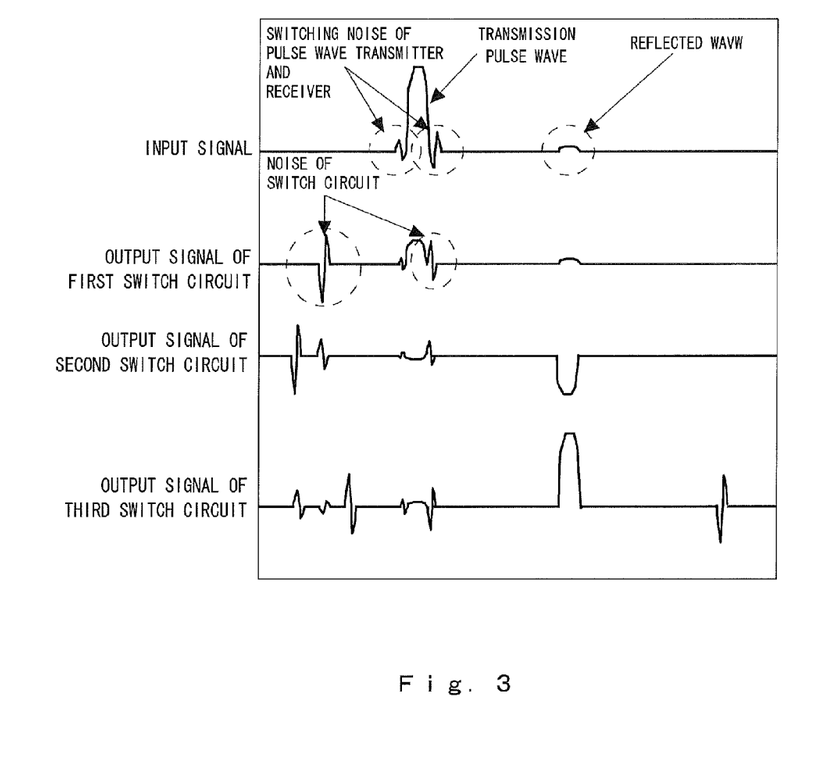
FIG. 3 is a diagram exemplifying an input signal to a baseband amplifier unit and output waveforms of the first to third switch circuits.

This is described with reference to FIG. 3. FIG. 3 is a diagram exemplifying the input signal to the baseband amplifier unit 5 of the pulse radar device 1 and the output waveforms of the first to third switch circuits 51, 53, and 55. The input signal contains the sneaking transmission pulse wave, the switching noise generated by the pulse wave transmitter and receiver 4, and the reflected wave.

As to the output signal of the first switch circuit 51, the noise generated in the first switch circuit 51 due to the switching operation by the first switch control signal of FIG. 2 is added to the input signal. Thus, as illustrated in FIG. 3, the sneaking transmission pulse wave and the switching noise contained in the input signal are attenuated. Note that, noise due to the transition of the first switch circuit 51 to the cut off state is added.

As to the output signal of the second switch circuit 53, the output signal of the first switch circuit 51 is inverted and amplified by the first inverting amplifier 52, and the noise generated in the second switch circuit 53 due to the switching operation by the second switch control signal of FIG. 2 is added. Thus, as illustrated in FIG. 3, the noise of the first switch circuit 51, and the sneaking transmission pulse wave and the switching noise contained in the input signal are attenuated. In addition, the noise due to the transition of the second switch circuit 53 to the cut off state is added. Note that, the reflected wave is inverted and amplified by the first inverting amplifier 52.

As to the output signal of the third switch circuit 55, the output signal of the second switch circuit 53 is inverted and amplified by the second inverting amplifier 54, and the noise generated in the third switch circuit 55 due to the switching operation by the third switch control signal of FIG. 2 is added. Thus, as illustrated in FIG. 3, the noises of the first and second switch circuits 51 and 53, and the sneaking transmission pulse wave and the switching noise contained in the input signal are attenuated. In addition, the noise due to the transition of the third switch circuit 53 to the conductive state is added. Note that, the reflected wave is inverted and amplified by the second inverting amplifier 54.

In this way, the baseband amplifier unit 5 can amplify the reflected wave while suppressing the interference signal such as the sneaking transmission pulse wave and the noises caused by the pulse wave transmitter and receiver 4 and the first to third switch circuits 51, 53, and 55 as much as possible. Because the reflected wave is inverted and amplified twice by the first and second inverting amplifiers 52 and 54, the reflected wave having the same phase as the input signal is contained in the output signal of the baseband amplifier unit 5. The output signal of the baseband amplifier unit 5 is input to a CPU after A/D conversion, and is used for detecting a distance, a relative speed, or the like by software.

Figure 4:
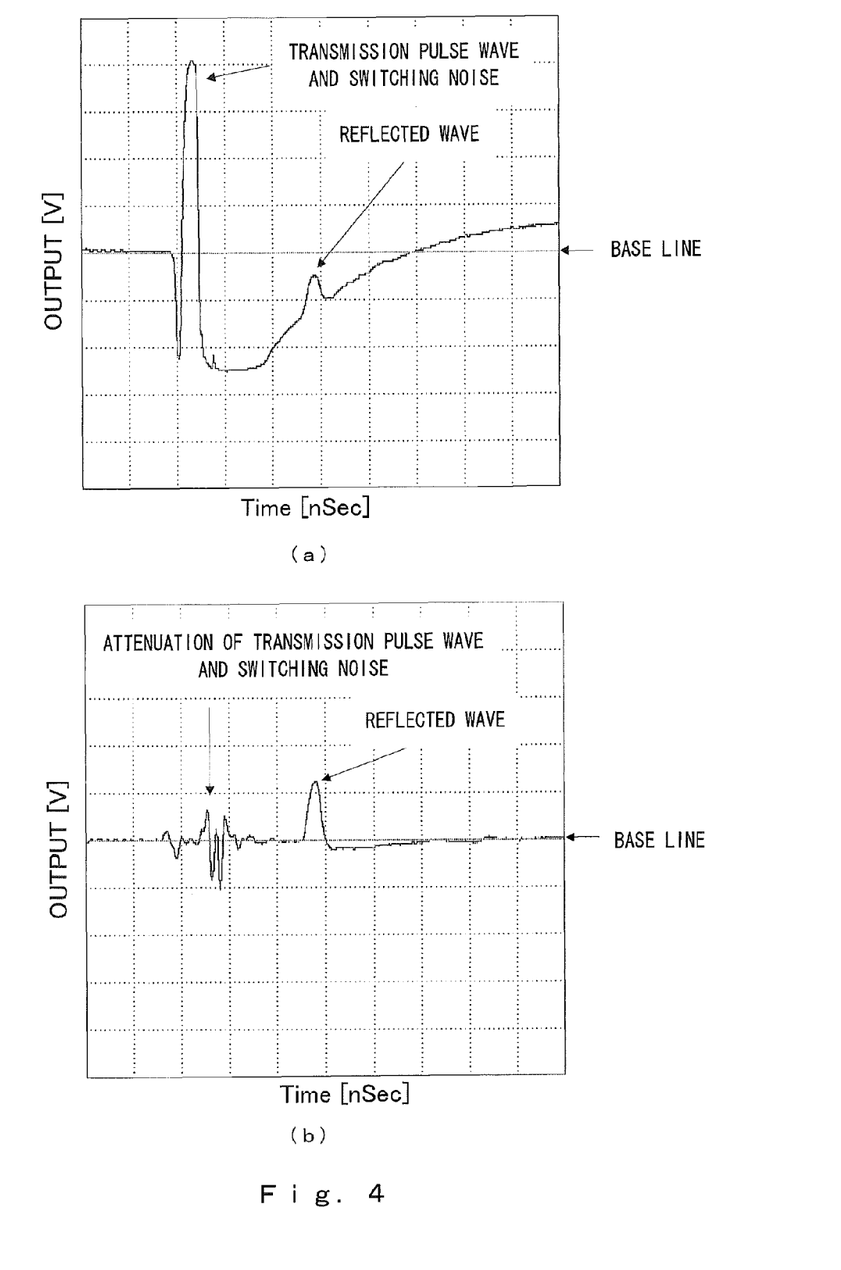
FIG. 4 is diagram illustrating a difference of an output signal of the pulse radar device depending on presence or absence of the baseband amplifier unit.

The pulse radar device 1 as described above uses the baseband amplifier unit 5, and hence can input, to an A/D converter circuit, the output signal containing the reflected wave having sufficiently large amplitude compared with the interference signal. FIG. 4 is graph showing a difference of the output signal of the pulse radar device 1 depending on presence or absence of the baseband amplifier unit 5. FIG. 4(a) shows a case where the baseband amplifier unit 5 is not provided, in which the interference signal has larger amplitude than the reflected wave. Therefore, when this signal is A/D converted and is used for detecting a distance or a relative speed, an accurate value cannot be obtained.

In contrast, in the case of FIG. 4(b) in which the baseband amplifier unit 5 is provided, the interference signal has sufficiently small amplitude compared with the reflected wave. In addition, a fluctuation with respect to a base line is smaller in the case where the baseband amplifier unit 5 is provided. Therefore, when this signal is A/D converted and is used for detecting a distance or a relative speed, a more accurate value can be obtained than heretofore.

Figure 5:
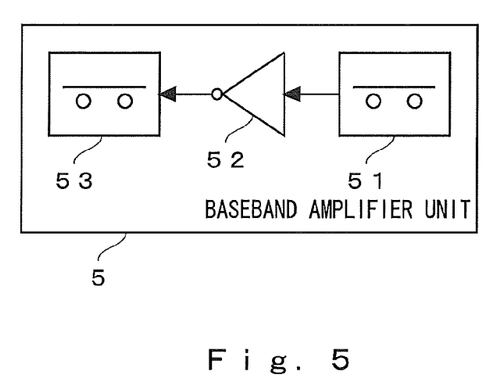
FIG. 5 is a block diagram of another example of the baseband amplifier unit.
Figure 6:
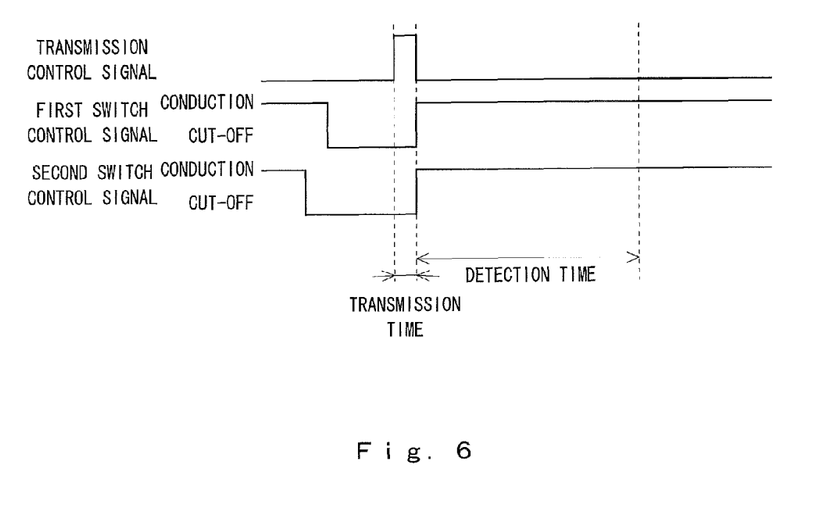
FIG. 6 is a diagram illustrating operation timings in another example of the baseband amplifier unit.

As illustrated in FIG. 5, the baseband amplifier unit 5 of the pulse radar device 1 may have a three-stage configuration including the first and second switch circuits 51 and 53 and the first inverting amplifier circuit 52. FIG. 6 illustrates the first and second switch control signals for controlling the switching operation of the first and second switch circuits 51 and 53 in this case. The first and second switch control signals make the same state transition as the first and second switch control signals illustrated in FIG. 2. Therefore, even in the three-stage configuration, the first and second switch circuits 51 and 53 operate in the same manner as the first and second switch circuits of the five-stage configuration. As a result, the output signal of the baseband amplifier unit 5 is the one that corresponds to the output signal of the second switch circuit 53 of FIG. 3.

What is claimed is:

1. A baseband amplifier unit to be installed in a pulse radar device which is configured to transmit from an antenna toward an object to be detected in a short distance a transmission pulse wave obtained by modulating a transmission control signal, and to be afterwards switched to a standby mode for receiving a reflected wave from the object to be detected, the baseband amplifier unit comprising:
   a first amplifier which amplifies the reflected wave;
   first switching means for switching the reflected wave to be input to the first amplifier from one of a conductive state and a cut off state to the other state;
   second switching means for switching a signal to be output from the first amplifier from one of the conductive state and the cut off state to the other state; and
   control means for outputting a first switch control signal for controlling the first switching means to switch to the cut off state before the transmission control signal rises and to switch back to the conductive state when the transmission control signal falls, and for outputting a second switch control signal for controlling the second switching means to switch to the cut off state before the first switching means becomes the cut off state and to switch back to the conductive state when the transmission control signal falls.

2. A baseband amplifier unit according to claim 1, further comprising:
   a second amplifier which amplifies the signal output from the second switching means; and
   third switching means for switching the signal output from the second amplifier from one of the conductive state and the cut off state to the other state,
   wherein the control means outputs a third switch control signal for controlling the third switching means to switch to the conductive state before the transmission control signal rises and after the first switching means becomes the cut off state, and to switch back to the cut off state with a sufficient time for receiving the reflected wave.

3. A baseband amplifier unit according to claim 2, wherein the first switching means, the second switching means, and the third switching means operate in the same polarity.

4. A baseband amplifier unit according to claim 2, wherein the first amplifier and the second amplifier each comprises an inverting amplifier.

5. A pulse radar device, comprising:
   a transmitter which generates a transmission pulse wave obtained by modulating a transmission control signal with a high frequency signal and transmits the transmission pulse wave from an antenna toward an object to be detected;
   a receiver which detects a reflected wave from the object to be detected that is received by the antenna;
   an amplifier which amplifies the reflected wave;
   first switching means for switching the reflected wave to be input to the amplifier from one of a conductive state and a cut off state to the other state;
   second switching means for switching a signal to be output from the amplifier from one of the conductive state and the cut off state to the other state; and
   control means for outputting a first switch control signal for controlling the first switching means to switch to the cut off state before the transmission control signal rises and to switch back to the conductive state when the transmission control signal falls, and for outputting a second switch control signal for controlling the second switching means to switch to the cut off state before the first switching means becomes the cut off state and to switch back to the conductive state when the transmission control signal falls.

* * * * *